US011210607B2

(12) United States Patent
Kenny et al.

(10) Patent No.: US 11,210,607 B2
(45) Date of Patent: Dec. 28, 2021

(54) AUTOMATED PREDICTIVE ANALYSIS AND MODIFICATION OF USER INTERACTION FEATURES USING MULTIPLE CLASSIFICATION MODELS

(71) Applicant: FMR LLC, Boston, MA (US)

(72) Inventors: Aidan Kenny, Kilkenny (IE); Adrian Ronayne, Claremorris (IE)

(73) Assignee: FMR LLC, Boston, MA (US)

( * ) Notice: Subject to any disclaimer, the term of this patent is extended or adjusted under 35 U.S.C. 154(b) by 342 days.

(21) Appl. No.: 16/395,789

(22) Filed: Apr. 26, 2019

(65) Prior Publication Data

US 2020/0342348 A1 Oct. 29, 2020

(51) Int. Cl.
*G06N 20/00* (2019.01)
*G06Q 30/00* (2012.01)
(Continued)

(52) U.S. Cl.
CPC ............ *G06N 20/00* (2019.01); *G06N 20/20* (2019.01); *G06Q 30/016* (2013.01); *G10L 15/00* (2013.01);
(Continued)

(58) Field of Classification Search
CPC ...... G06N 20/00; G06N 20/20; G06Q 30/016; G10L 15/00; G10L 15/04; G10L 15/08;
(Continued)

(56) References Cited

U.S. PATENT DOCUMENTS 9,792,908 B1 10/2017 Bassemir et al.
2005/0060158 A1 * 3/2005 Endo ...................... G10L 15/22 704/275

(Continued)

FOREIGN PATENT DOCUMENTS

WO 2012155079 A2 11/2012
WO WO-2012155079 A2 * 11/2012 ............ G10L 15/22

OTHER PUBLICATIONS

Subramaniam et. al., "Business Intelligence from Voice of Customer", 2009, 25th International Conference on Data Engineering, vol. 25 (2009), pp. 1391-1402 (Year: 2009).*

(Continued)

*Primary Examiner* — Viker A Lamardo
*Assistant Examiner* — Leonard A Sieger
(74) *Attorney, Agent, or Firm* — Proskauer Rose LLP

(57) ABSTRACT

Methods and apparatuses are described for automated predictive analysis of user interactions to determine a modification based upon competing classification models. A server computing device receives first encoded text for prior user interactions and trains a plurality of classification models using the first text. The server determines a prediction cost for each of the models based upon the training. The server receives second encoded text for a current user interaction and executes the trained models using the second text to generate a prediction vector for each model that maximizes user engagement. The server selects one of the models based upon the prediction vectors, identifies a communication feature of the model, generates a user interaction modification, and transmits the user interaction modification to a client computing device.

18 Claims, 4 Drawing Sheets

Receive first encoded text corresponding to prior user interactions 202

Train a plurality of artificial intelligence classification models using the first encoded text 204

Determine a prediction cost for each of the plurality of artificial intelligence classification models based upon the training 206

Receive second encoded text corresponding to a current user interaction 208

Execute the plurality of trained artificial intelligence classification models using the second encoded text to generate a prediction vector for each model 210

Select one of the plurality of artificial intelligence classification models based upon the prediction vectors and the prediction costs 212

Identify the communication feature upon which the selected artificial intelligence classification model was trained 214

Generate a user interaction modification based upon the identified communication feature 216

Transmit the generated user interaction modification to at least one of the first remote computing device or the second remote computing device 218

200

(51) Int. Cl.

| | |
|---|---|
| ***G06N 20/20*** | (2019.01) |
| *G10L 15/04* | (2013.01) |
| *G10L 15/16* | (2006.01) |
| *G10L 15/22* | (2006.01) |
| *G10L 15/00* | (2013.01) |
| *G10L 15/18* | (2013.01) |
| *G10L 15/08* | (2006.01) |
| *G10L 15/26* | (2006.01) |

(52) U.S. Cl.
CPC .............. *G10L 15/04* (2013.01); *G10L 15/08* (2013.01); *G10L 15/16* (2013.01); *G10L 15/18* (2013.01); *G10L 15/1807* (2013.01); *G10L 15/22* (2013.01); *G10L 15/26* (2013.01)

(58) Field of Classification Search
CPC ..... G10L 15/16; G10L 15/18; G10L 15/1807; G10L 15/22; G10L 15/26
See application file for complete search history.

(56) References Cited

U.S. PATENT DOCUMENTS

2013/0272511 A1* 10/2013 Bouzid .................... G06F 8/38 379/88.01
2016/0162800 A1* 6/2016 Qin ..................... G06N 3/0454 706/12
2017/0187880 A1* 6/2017 Raanani .............. H04M 3/5191
2020/0202256 A1* 6/2020 Chaudhari ........... G06K 9/6218

OTHER PUBLICATIONS

Fayek et. al., "Modeling Subjectiveness in Emotion Recognition with Deep Neural Networks: Ensembles vs Soft Labels", 2016, International Joint Conference on Neural Networks (IJCNN), vol. 2016, pp. 566-570 (Year: 2016).*
Faridani et. al., "LabelBoost: An Ensemble Model for Ground Truth Inference Using Boosted Trees", 2013, Proceedings of the AAAI Conference on Human Computation and Crowdsourcing, vol. 2013, pp. 18-19 (Year: 2013).*

* cited by examiner

| | id | 302 words | 304 timetaken | 306 customerid | 308 engagementlevel | 310 onehotsentence |
|---|---|---|---|---|---|---|
| 0 | 1 | Can I call you back in 20 minutes | 20 | general | a | [1. 0. 0.] |
| 1 | 2 | Can I facebook you in 20 minutes | 15 | millenial | b | [0. 1. 0.] |
| 2 | 3 | Can we schedule a meet in 20 minutes | 10 | businessprofessional | c | [0. 0. 1.] |

FIG. 3

AUTOMATED PREDICTIVE ANALYSIS AND MODIFICATION OF USER INTERACTION FEATURES USING MULTIPLE CLASSIFICATION MODELS

TECHNICAL FIELD

This application relates generally to methods and apparatuses, including computer program products, for automated predictive analysis and modification of user interaction features using multiple classification models.

BACKGROUND

In a typical customer contact environment, where customers call in or establish chat sessions with live or automated agents, customers tend to be serviced with a one-size-fits all paradigm. For example, a customer service representative (CSR) generally speaks to all different customers in the same fashion—using the same tone of voice, the same speed, the same volume, the same word choice, and so forth. Similarly, automated chat bot agents or interactive voice response (IVR) systems are programmed to interact with customers using predefined communication characteristics—speed, word choice, and the like.

However, this approach can lead to wildly diverging levels of customer satisfaction and engagement—a 20-year-old student may be more engaged and satisfied with a CSR or chat bot that communicates in a specific way than a 70-year-old company executive. Current computing systems that handle communication sessions between customers and agents are typically not configured to recognize differences between individual customers and predict a communication style that would improve or maximize customer engagement, then generate actionable instructions to a computing device of the agent to either provide recommendations on how to modify the communication style or programmatically alter the delivery of such communications to be better suited to the individual customer.

In addition, the goal of such systems is about personalizing the interactions with customers to the extent that they feel more comfortable interacting with a CSR, chat bot or other points of interaction (e.g. through social media, through emerging interfaces like voice systems, augmented reality (AR), virtual reality (VR)). With the rise of automation and the increased application of artificial intelligence, machine learning and cognitive computing, it may be expected to see more customer support activities being automated and less involving human-to-human interaction. There has also been an emergence of automated call origination technology (e.g. ask your phone to book a dentist appointment and it makes the call using an automated voice system to make the booking for you). Therefore, having the ability to intelligently optimize and customize interactions with customers is becoming increasingly important in this environment. However, current systems lack the toolset necessary to achieve truly customized interactions that account for specific communication styles.

SUMMARY

Therefore, what is needed are methods and systems that utilize a large corpus of historical user interaction and engagement data in a multi-model artificial intelligence framework to generate recommendations and modifications to user interactions to increase customer engagement. The techniques described herein provide the technical advantage of generating highly-dimensionalized context vectors for each user interaction based upon specific communication features and attributes of an agent participating in the interaction, and then executing a plurality of competing classification models (built using neural network architecture and each trained on a different communication feature), then comparing the results from each classification model from both an accuracy and cost perspective, to determine a classification model that produces a prediction that maximizes user engagement. The techniques described herein further adapt existing live and/or automated communication sessions between computing devices based upon the prediction to effect changes to the communication style of a participant to the session based upon the prediction of the chosen classification model.

The invention, in one aspect, features a system for automated, predictive analysis of user interactions to determine a modification to one or more features of the user interactions based upon a plurality of competing artificial intelligence classification models. The system includes a first client computing device of a first communication participant, a second client computing device of a second communication participant, and a server computing device coupled to the first client computing device and the second client computing device via one or more network connections, the server computing device comprising a memory for storing programmatic instructions and a processor that executes the programmatic instructions. The server computing device receives first encoded text corresponding to prior user interactions, each segment of the first encoded text comprising one or more multidimensional vectors representing a prior user interaction, where each multidimensional vector comprises one or more communication features of the prior user interaction and a user engagement level associated with the prior user interaction. The server computing device trains, using the first encoded text, a plurality of artificial intelligence classification models executing on the server computing device, where each artificial intelligence classification model is trained according to a different one of the one or more communication features. The server computing device determines a prediction cost for each of the plurality of artificial intelligence classification models based upon the training. The server computing device receives second encoded text corresponding to a current user interaction between the first client computing device and the second client computing device, each segment of the second encoded text comprising one or more multidimensional vectors representing the current user interaction, where each multidimensional vector comprises one or more communication features of the current user interaction. The server computing device executes, using the second encoded text, the plurality of trained artificial intelligence classification models to generate a prediction vector for each trained artificial intelligence classification model, where each prediction vector comprises a predicted value for the one or more communication features of the current user interaction that maximizes user engagement. The server computing device selects one of the plurality of trained artificial intelligence classification models based upon the prediction vectors generated from the plurality of trained artificial intelligence classification models and the prediction cost associated with the plurality of trained artificial intelligence classification models. The server computing device identifies the communication feature upon which the selected artificial intelligence classification model was trained. The server computing device generates a user interaction modification based upon the identified communication feature.

The server computing device transmits the generated user interaction modification to at least one of the first client computing device or the second client computing device.

The invention, in another aspect, features a computerized method of automated, predictive analysis of user interactions to determine a modification to one or more features of the user interactions based upon a plurality of competing artificial intelligence classification models. A server computing device, coupled to a first client computing device of a first communication participant and to a second client computing device of a second communication participant via one or more network connections, receives first encoded text corresponding to prior user interactions, each segment of the first encoded text comprising one or more multidimensional vectors representing a prior user interaction, where each multidimensional vector comprises one or more communication features of the prior user interaction and a user engagement level associated with the prior user interaction. The server computing device trains, using the first encoded text, a plurality of artificial intelligence classification models executing on the server computing device, where each artificial intelligence classification model is trained according to a different one of the one or more communication features. The server computing device determines a prediction cost for each of the plurality of artificial intelligence classification models based upon the training. The server computing device receives second encoded text corresponding to a current user interaction between the first client computing device and the second client computing device, each segment of the second encoded text comprising one or more multidimensional vectors representing the current user interaction, where each multidimensional vector comprises one or more communication features of the current user interaction. The server computing device executes, using the second encoded text, the plurality of trained artificial intelligence classification models to generate a prediction vector for each trained artificial intelligence classification model, where each prediction vector comprises a predicted value for the one or more communication features of the current user interaction that maximizes user engagement. The server computing device selects one of the plurality of trained artificial intelligence classification models based upon the prediction vectors generated from the plurality of trained artificial intelligence classification models and the prediction cost associated with the plurality of trained artificial intelligence classification models. The server computing device identifies the communication feature upon which the selected artificial intelligence classification model was trained. The server computing device generates a user interaction modification based upon the identified communication feature. The server computing device transmits the generated user interaction modification to at least one of the first client computing device or the second client computing device.

Any of the above aspects can include one or more of the following features. In some embodiments, one or more of the plurality of artificial intelligence classification models comprises a neural network. In some embodiments, the prior user interactions comprise online chat messages or digital speech segments. In some embodiments, the one or more communication features comprise tone, speed, volume, or word choice.

In some embodiments, selecting one of the plurality of trained artificial intelligence classification models based upon the prediction vectors generated from the plurality of trained artificial intelligence classification models and the prediction cost associated with the plurality of trained artificial intelligence classification models comprises determining, for each communication feature of the prediction vectors, an accuracy value for each prediction vector; aggregating the accuracy value for each prediction vector and the prediction cost associated with the trained artificial intelligence classification model that generated the prediction vector to determine an optimal prediction vector; and selecting the trained artificial intelligence classification model associated with the optimal prediction vector. In some embodiments, generating a user interaction modification based upon the identified communication feature comprises creating a recommendation message instructing a communication participant to change the identified communication feature in subsequent user interactions.

In some embodiments, the server computing device comprises a plurality of processors and each artificial intelligence classification model executes on a different processor of the server computing device. In some embodiments, each of the plurality of processors comprises a GPU.

In some embodiments, the server computing device uses the prediction vectors generated by executing the plurality of trained artificial intelligence classification models to train the artificial intelligence classification models prior to subsequent user interactions. In some embodiments, at least one of the first client computing device and the second client computing device displays the generated user interaction modification to the corresponding communication participant. In some embodiments, at least one of the first client computing device and the second client computing device adapts a communication stream based upon the generated user interaction modification.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is an exemplary data set used by the classification model training module to train the plurality of classification models.

DETAILED DESCRIPTION

Figure 1:
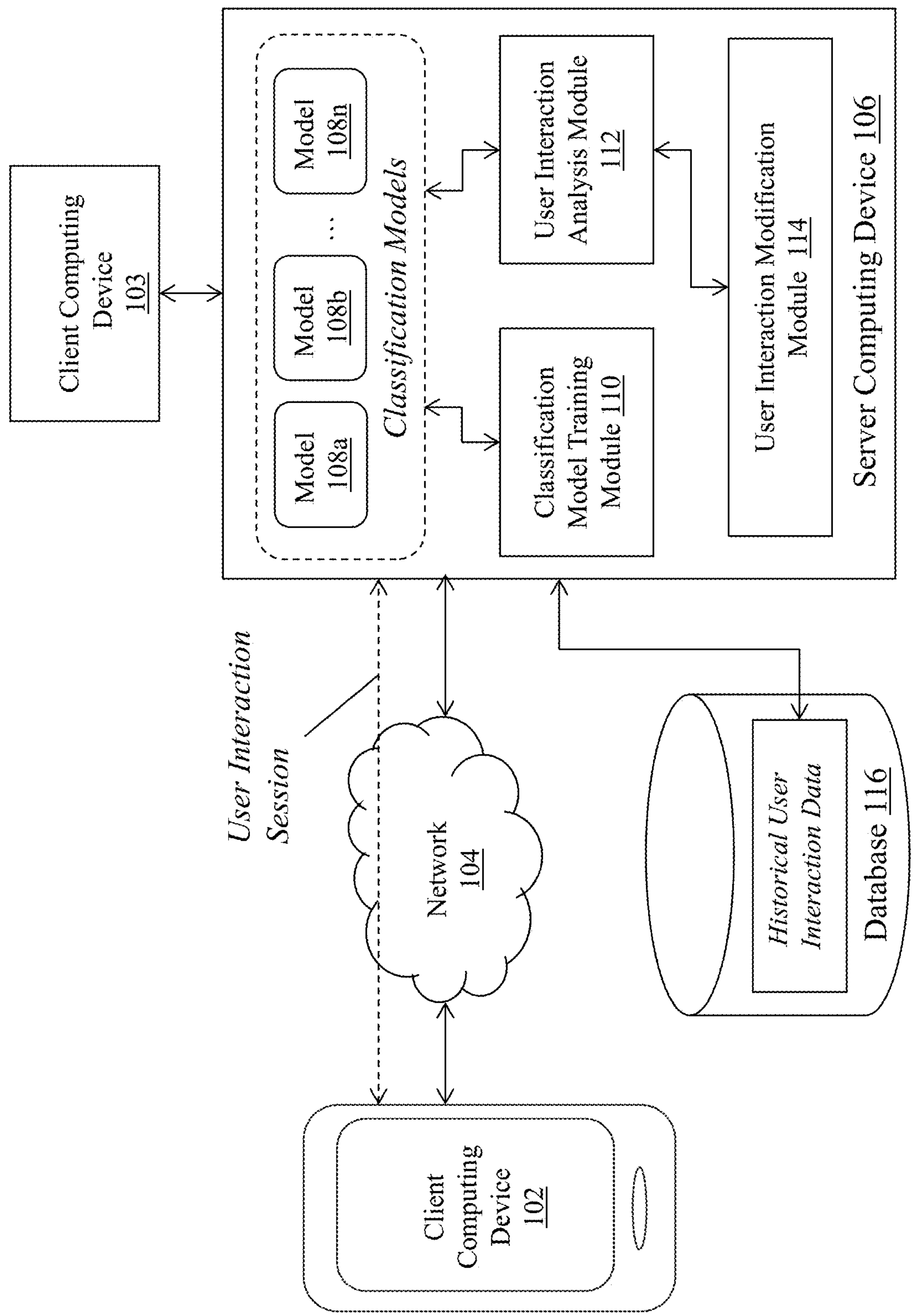
FIG. 1 is a block diagram of a system for automated, predictive analysis of user interactions to determine a modification to one or more features of the user interactions.

FIG. 1 is a block diagram of a system 100 for automated predictive analysis of user interactions to determine a modification to one or more features of the user interactions. The system 100 includes a client computing device 102, a client computing device 103, a communications network 104, a server computing device 106 that includes a plurality of artificial intelligence classification models 108$a$-108$n$, a classification model training module 110, a user interaction analysis module 112, and a user interaction modification module 114, and a database 116 that includes historical user interaction data.

The client computing device 102 connects to the communications network 104 in order to communicate with the server computing device 106 to provide input and receive output relating to the process of automated predictive analysis of user interactions to determine a modification to one or more features of the user interactions as described herein. Exemplary client computing devices 102 include but are not limited to computing devices such as smartphones, tablets, laptops, desktops, smart watches, IP telephony devices, internet appliances, or other devices capable of establishing a user interaction communication session, such as a voice call or a text chat session, with client computing device 103 via server computing device 106. It should be appreciated that other types of devices that are capable of connecting to the components of the system 100 can be used without departing from the scope of invention.

The client computing device 103 is a computing device coupled to the server computing device 106 (e.g., either directly or via local communication network) and used to establish and participate in user interaction communication sessions that originate from the client computing device 102. In one example, the client computing device 103 is a workstation (e.g., desktop computer, laptop computer, telephony device) of a customer service agent in a call center that enables the agent to receive voice calls and/or text messages from client device 102, access information and perform actions using software on the client computing device 103 to provide responses and/or solutions to messages submitted by the client device 102. The client computing device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. In some embodiments, the client computing device 103 is a telephony device that is coupled to a computing device, where the telephony device receives a voice call that originated at the client computing device 102 and is routed through the server computing device 106 as described herein. As can be appreciated, other types of client computing devices 103 that can establish a voice communication session and/or text-based communication session with the server computing device 106 and/or the client computing device 102 are within the scope of invention.

In some embodiments, the client computing device 103 can comprise an automated software program (e.g., a chat bot, an interactive voice response (IVR) platform) that receives user interactions from client device 102 and responds to the user interactions. In these embodiments, an actual customer service agent is not required to control or monitor the client device 103; instead, the software program is configured to participate in a communication session with a user at client device 102 automatically. For example, a user at client computing device 102 can establish a communication session with client computing device 103 via server computing device 106 by, e.g., opening a chat window in browser software that connects to the server computing device 106—which interfaces with client computing device 103 to automatically respond to text messages provided from client device 102. Other types of automated response systems can be utilized within the scope of invention described herein.

The communications network 104 enables the client computing device 102 to communicate with the server computing device 106 and the client computing device 103. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 a device including specialized hardware and/or software modules that execute on a processor and interact with memory modules of the server computing device 106, to receive data from other components of the system 100, transmit data to other components of the system 100, and perform functions for automated predictive analysis of user interactions to determine a modification to one or more features of the user interactions as described herein. The server computing device 106 includes a plurality of artificial intelligence classification models 108$a$-108$n$ (e.g., neural networks) executing on one or more processors of the device 106, and several computing modules 110, 112, 114 that execute on one or more processors of the server computing device 106. In some embodiments, the modules 110, 112, 114 are specialized sets of computer software instructions programmed onto one or more dedicated processors in the server computing device 106 and can include specifically-designated memory locations and/or registers for executing the specialized computer software instructions.

Although the classification models 108$a$-108$n$ and the computing modules 110, 112, 114 are shown in FIG. 1 as executing within the same server computing device 106, in some embodiments the models 108$a$-108$n$ and/or the functionality of the modules 110, 112, 114 can be distributed among a plurality of server computing devices. As shown in FIG. 1, the server computing device 106 enables the models 108$a$-108$n$ and the modules 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the models 108$a$-108$n$ and the computing modules 110, 112, 114 is described in detail below.

The database 116 is a computing device (or in some embodiments, a set of computing devices) coupled to the server computing device 106 and is configured to receive, generate, and store specific segments of data relating to the process of automated predictive analysis of user interactions to determine a modification to one or more features of the user interactions as described herein. In some embodiments, all or a portion of the database 116 can be integrated with the server computing device 106 or be located on a separate computing device or devices. The database 116 can comprise one or more databases configured to store portions of data used by the other components of the system 100, as will be described in greater detail below. An exemplary database 116 is MySQL™ available from Oracle Corp. of Redwood City, Calif.

The database 116 includes historical user interaction data which, in some embodiments, is a dedicated section of the database 116 that contains specialized data used by the other components of the system 110 to perform the automated predictive analysis of user interactions to determine a modification to one or more features of the user interactions as described herein. Further detail on the structure and function of the historical user interaction data is provided below.

Figure 2:
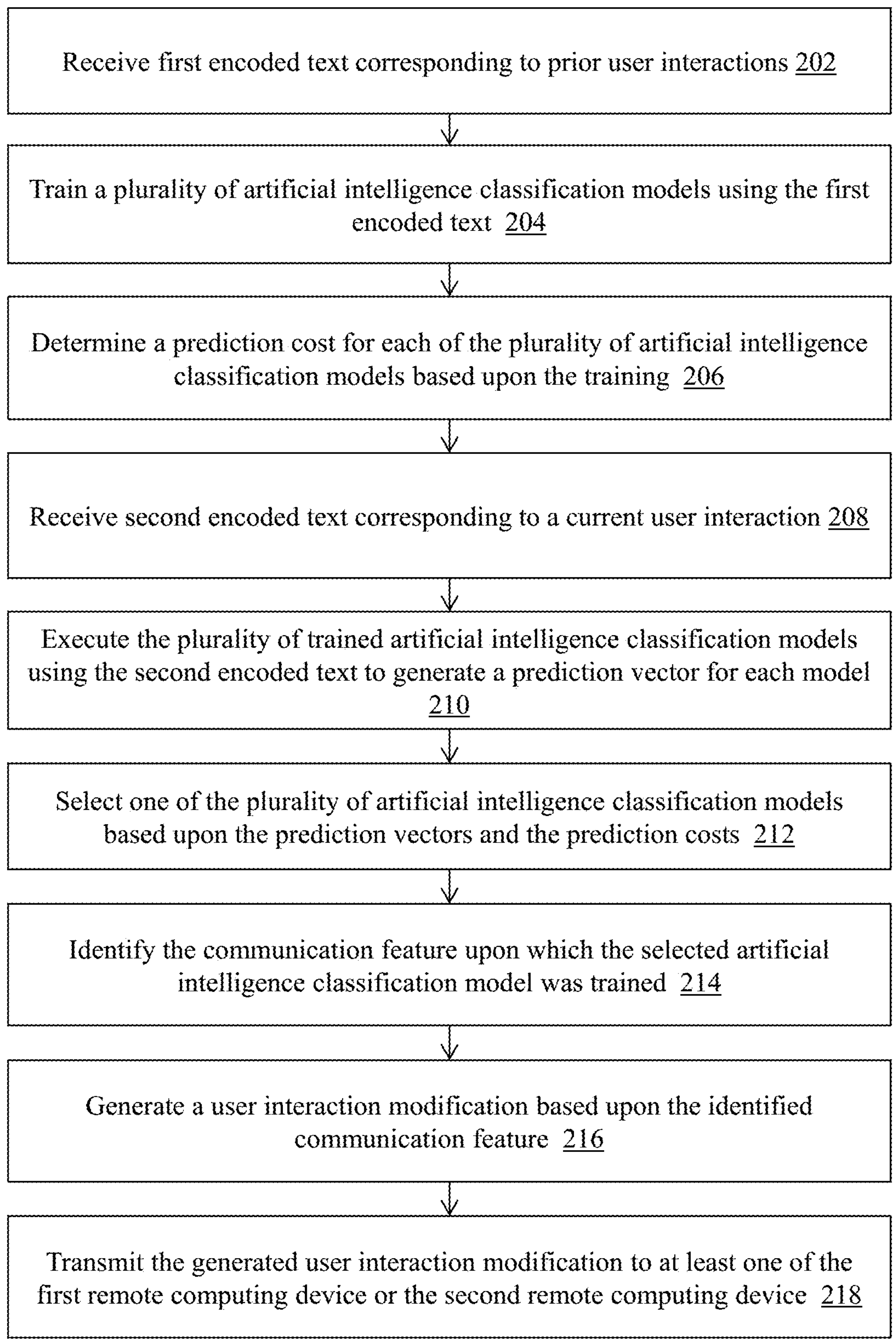
FIG. 2 is a flow diagram of a computerized method for automated, predictive analysis of user interactions to determine a modification to one or more features of the user interactions.

FIG. 2 is a flow diagram of a computerized method 200 for automated, predictive analysis of user interactions to determine a modification to one or more features of the user interactions, using the system 100 of FIG. 1. The client computing device 102 initiates a communication session (e.g., voice call, text chat session) via communications network 104 to, e.g., server computing device 106. For example, a user at client computing device 102 can launch a telephony application (for voice) or a chat application/browser window (for text chat), which establishes a connection to server computing device 106. The server computing device 106 can route the communication session to client computing device 103 (e.g., a workstation of a customer service agent, an automated IVR or chat bot module, etc.) to participate in the communication session with the client computing device 102.

As the user of client computing device 102 and an agent at client computing device 103 begin speaking to each other in the case of a voice call, the server computing device 106 can capture one or more digitized voice segments corresponding to speech of the agent—as the agent is responding to a question or providing information. For example, the user may be asking a question about certain products or services, the user may be requesting information about his or her account, or the user may be providing a complaint. In some embodiments, the server computing device 106 captures, e.g., a digital bitstream of the voice call and parses the bitstream to locate the speech segments associated with the agent. It should be appreciated that the server computing device 106 is capable of digitizing the voice segments, in the case that the segments are captured or otherwise received in non-digital form. The server computing device 106 can also perform functions to improve the audio quality of the digitized voice segments, such as adjusting compression, converting the segments to another format, reducing or eliminating background noise, and so forth. The server computing device 106 stores the captured file in database 116. It should be appreciated that, in some embodiments, the server computing device 106 continuously captures digitized voice segments from the agent throughout the call and uses the voice segments in the manner described herein. For example, the server computing device 106 can be configured to continuously capture and measure digitized voice segments according to defined settings (e.g., 10-second segments, 20-second segments, 60-second segments).

The server computing device 106 can analyze the digitized voice segment to convert the digitized voice segment into unstructured computer text. In some embodiments, the server computing device 106 can utilize two core functionalities to convert the voice segment into text: speech recognition and grammar analysis. In one example, the server computing device 106 can use a speech recognition library, such as the Speech Recognition API available from Microsoft Corporation, to convert the digitized speech file into text. In some embodiments, the server computing device 106 can leverage external resources, such as a grammar library accessible via the internet, in order to accurately determine the words and phrases contained within the digitized voice segment.

In the case of a chat session, as the user of client computing device 102 and an automated chat bot agent at client computing device 103 begin exchanging text messages with each other, the server computing device 106 can capture one or more text segments corresponding to messages of the agent—as the agent is responding to a question or providing information. The server computing device 106 stores the captured text in database 116. It should be appreciated that, in some embodiments, the server computing device 106 continuously captures text segments from the agent throughout the chat session and uses the text segments in the manner described herein. For example, the server computing device 106 can be configured to continuously capture and measure text segments according to defined settings (e.g., single message segments, multiple message segments). In some embodiments, the server computing device 106 can record one or more timestamps associated with the text messages to determine how quickly or how slowly the messages are provided in the chat session.

In either case (voice call or chat session), the server computing device 106 captures unstructured computer text associated with communications made by the agent and stores the text in, e.g., database 116. The classification model training module 110 then processes the unstructured computer text to generate encoded text, in the form of one or multidimensional vectors each comprising one or more communication features of the user interaction. Exemplary communication features include, but are not limited to, tone, speed, volume, and/or word choice.

In one embodiment, the classification model training module 110 converts each statement in the unstructured computer text into a one-hot vector that is based upon one or more of communication features. For example, in some embodiments, the one-hot vector is based upon the number of statements in the unstructured computer text, as shown below.

Consider that the unstructured computer text comprises three statements:

1) "Can I call you back in 20 minutes?"

2) "Can I facebook you in 20 minutes?"

3) "Can we schedule a meeting in 20 minutes?"

The vectors generated by the classification model training module 110 for these sentences are:

"Can I call you back in 20 minutes?"→[1. 0. 0.]

"Can I facebook you in 20 minutes?"→[0. 1. 0.]

"Can we schedule a meeting in 20 minutes?"→[0. 0. 1.]

Each vector is of length 3, as there are three unique sentences in the dataset.

If another, similar sentence is added to the unstructured computer text (i.e., "Can we schedule a meeting in 30 minutes?" then the following vectors are generated:

"Can I call you back in 20 minutes?"→[1. 0. 0. 0.]

"Can I facebook you in 20 minutes?"→[0. 1. 0. 0.]

"Can we schedule a meeting in 20 minutes?"→[0. 0. 1. 0.]

"Can we schedule a meeting in 20 minutes?"→[0. 0. 0. 1.]

As there are now 4 unique sentences a vector of length 4 is produced.

Depending on the type of encoding scheme utilized by the classification model training module 110, the produced vectors can differ. In some embodiments, the classification model training module 110 uses an alternate encoding methodology, such as word2vec, which captures context between words.

It should be appreciated that the server computing device 106 also captures and stores encoded text from prior user interactions, in order to build a set of training data that is then used by the classification model training module 110 to train the plurality of classification models 108*a*-108*c* to predict cost and user engagement, as described herein. For example, as users at many different client computing devices (such as device 102) establish communication sessions with server computing device 106 and client computing device 103, the user interactions generated by the client computing device 103 (e.g., service agent and/or chat bot) are captured and vectorized as described above. In addition, the server computing device 106 determines a user engagement level associated with the user interaction(s)—i.e., is the customer at device 102 engaged in the conversation and appreciating the value of the conversation or not? The server computing device 106 can associate the multidimensional vectors of the user interaction(s) with the determined engagement level and store the values in, e.g., database 116 for training purposes.

FIG. 3 is an exemplary data set that can be used by the classification model training module 110 to train the plurality of classification models 108*a*-108*n* as described herein. As shown in FIG. 3, the data set comprises a response message 302 ('words') captured by the server computing device 106, a time value 304 ('timetaken') in seconds of how long it took the agent to deliver the entire message, a customer type 306 ('customerid') that relates to the profile of the customer at client device 102 (e.g., is the customer a millennial? a business professional? etc.), an engagement level 308 corresponding to the response message, and a multidimensional vector 310 that reflects the characteristics of the response.

Turning to FIG. 2, the classification model training module 110 receives (202) first encoded text corresponding to prior user interactions from database 116. As explained above, the first encoded text can comprise a plurality of multidimensional vectors that corresponds to prior user interactions captured by the system 100. The classification model training module 110 also receives the user engagement level associated with the prior user interactions—this can be considered the outcome of the user interaction, against which the output of each of the plurality of classification models 108*a*-108*n* is evaluated for accuracy and cost. The classification model training module 110 trains (204) the plurality of classification models 108*a*-108*n* using the multidimensional vectors of the first encoded test, to predict a user engagement associated with the vectors. It should be appreciated that each of the plurality of classification models 108*a*-108*n* is trained according to a different one of the one or more communication features as described above. Generally, the hyper-parameters (choice of cost function, learning rate, layer configuration) of the models 108*a*-108*n* can differ depending on the type of competing models. However, the weights of the competing classification models 108*a*-108*n* are typically be randomly initialized, therefore each model upon training completion contains a different set of trained weights. As such, multiple models using same training data can be instantiated with differing weights and some of these competing models may perform better than others due to more favorable weight initialization.

For example, a first classification model 108*a* can be trained to predict a tone (i.e., tone of the speech/text issued by the agent of client device 103) that would result in a maximum engagement level (or, in some embodiments, an optimal engagement level in view of an associated prediction cost)—while a second classification model 108*b* can be trained to predict a speed (i.e., how fast or slow the speech/text is delivered by the agent of client device 103) that would result in a maximum engagement level (or optimal engagement level in view of prediction cost).

In some embodiments, each of the plurality of classification models 108*a*-108*n* is built as shallow neural networks having an input layer, a hidden layer (i.e., a sigmoid function), and an output layer. The one-hot vector is used as input to the neural network, and the output is generated as an engagement level associated with the input. During training, the classification model training module 110 executes many iterations of each classification model 108*a*-108*n* using the corpus of input vectors in order to minimize a cost function (e.g., using gradient descent) associated with generating a prediction of the engagement level that matches the actual engagement level obtained from database 116. At the conclusion of the training phase, the classification model training module 110 determines (206) a prediction cost for each of the plurality of artificial intelligence classification models—that is, a measure of how accurate or confident each respective classification model 108*a*-108*n* is in the predictions that it generated during training. For example, a classification model that has a lower prediction cost can be considered as more accurate or confident.

Once each of the classification models 108*a*-108*n* is trained, the server computing device 106 can utilize the trained models on incoming encoded text from a current user interaction to determine which classification model generates a prediction that maximizes or optimizes engagement level, then generate a user interaction modification for the client computing device 103 based upon which communication feature the determined classification model was trained. The user interaction analysis module 112 receives (208) second encoded text corresponding to a current user interaction between the client computing device 102 and the client computing device 103. As explained above, the client devices 102, 103 can be engaged in a voice or text communication session and the server computing device 106 can capture digitized voice segments or text segments from an agent at client device 103, then vectorize the text associated with those segments. Each segment of the second encoded text comprises one or more multidimensional vectors representing the current user interaction, and each vector includes values corresponding to one or more communication features (e.g., speed, tone, time, word choice) of the interaction.

Figure 4:
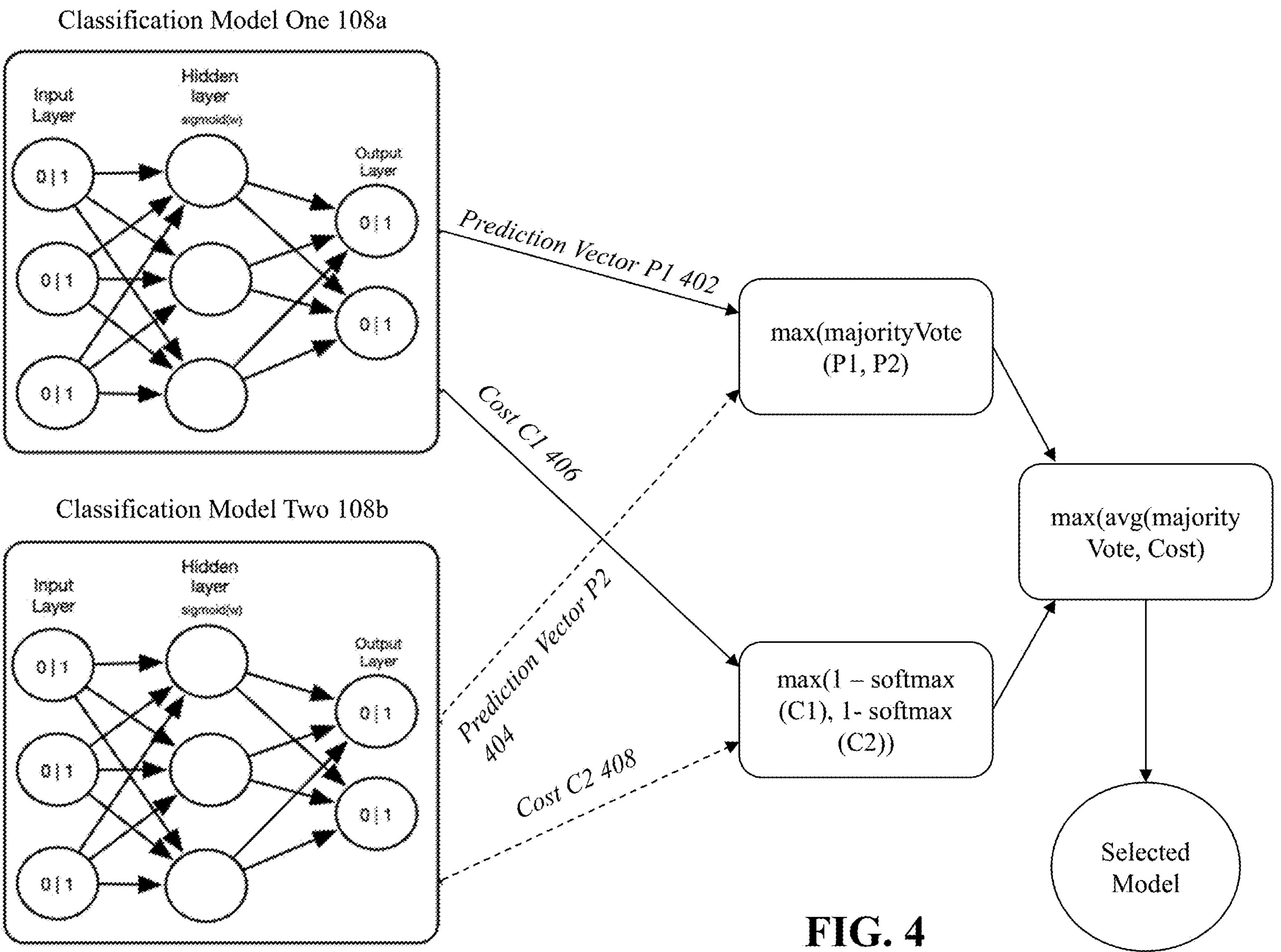
FIG. 4 is a diagram of a plurality of artificial intelligence classification models executing to generate a prediction vector for determining a modification to one or more features of user interactions.

Next, the user interaction analysis module 112 executes (210) the plurality of trained artificial intelligence classification models 108*a*-108*n* using the second encoded text as input, to generate a prediction vector for each trained artificial intelligence classification model. In one embodiment, the prediction vector comprises a predicted value for the one or more communication features of the current user interaction that maximizes (or optimizes) user engagement. FIG. 4 is a diagram of the plurality of artificial intelligence classification models 108*a*-108*n* of the system 100 of FIG. 1 executing to generate a prediction vector for determining a modification to one or more features of user interactions. As shown in FIG. 4, two classification models (Classification Model One 108*a* and Classification Model Two 108*b*) execute to generate a prediction vector (i.e., ModelOnePrediction 402 and ModelTwoPrediction 404, respectively). It should be appreciated that a plurality of additional classification models can be executed and their prediction vectors incorporated into the overall workflow described in FIG. 4.

The user interaction analysis module 112 then selects (212) one of the plurality of trained artificial intelligence classification models 108*a*-108*n* based upon the prediction vectors generated by the models and the prediction costs associated with the models. As explained above, each prediction vector comprises values for one or more communication features that the model predicts to maximize engagement level of the user at client device 102. The user interaction analysis module 112 executes a majority vote algorithm using each prediction vector from the classification models 108*a*, 108*b* to determine which model's prediction is more accurate for each communication feature in the vectors. For example, the prediction vector P1 produced by Classification Model One 108*a* comprises a plurality of features (f1a, f1b, . . . , fn). Similarly, the prediction vector P2 produced by Classification Model Two 108*b* comprises a plurality of features (f2a, f2b, . . . , fnb). The user interaction analysis module 112 compares each pair of features (i.e, f1a-f2a; f1b-f2b; etc.) in the prediction vectors P1 and P2 to determine which feature is more accurate (i.e., which feature value is closer to a ground truth value (gt)).

In one example:

- If f1a is greater than f2a, and gt==0, then the module 112 adds one vote to prediction vector P2 (because f2a is closer to gt);
- If f1a is less than f2a, and gt==0, then the module 112 adds one vote to prediction vector P1 (because f1a is closer to gt);
- If f1a is greater than f2a, and gt==1, then the module 112 adds one vote to prediction vector P1 (because f1a is closer to gt); or
- If f1a is less than f2a, and gt==1, then the module 112 adds one vote to prediction vector P2 (because f2a is closer to gt).

The user interaction analysis module 112 determines the prediction vector that has the highest number of votes (MV)—which means that the classification model associated with that prediction vector produced a more accurate prediction of the user engagement.

The user interaction analysis module 112 also evaluates the prediction costs associated with each of the classification models 108*a*-108*n* to determine which model to select. As mentioned previously, training of each classification model generates a prediction cost, which is the result of minimization via gradient descent. As shown in FIG. 4, the user interaction analysis module 112 transforms this cost into a probability value by applying a softmax function on the cost, then subtracting the result from 1 (so that the model with the lowest cost has the highest probability). For example, the cost C1 406 of Classification Model One 108*a* is 1.88 while the cost C2 of Classification Model 108*b* is 1.00. The user interaction analysis module 112 applies a softmax function to each cost C1 and C2, subtracts each value from 1, and determines the maximum:

$$\text{Cost}=\max(1-\text{softmax}(C1),1-\text{softmax}(C2))$$

The user interaction analysis module 112 then determines a maximum of the average of the majority vote and the cost values described above to select one of the plurality of classification models 108*a*, 108*b* that is associated with the most accurate or confident prediction:

$$\max(\text{avg}(MV,\text{Cost})$$

For example, Classification Model Two 108*b* may have provided a prediction vector that is associated with the most accurate or confident prediction—where, e.g., a communication speed closer to zero (meaning slower speech, when 0=slow speech, and 1=fast speech) is predicted to produce maximum user engagement. In that case, the user interaction analysis module 112 can select the model 108*b* to use in order to modify the user interaction as explained below.

The user interaction analysis module 112 identifies (214) the communication feature upon which the selected classification model (i.e., model 108*b*) was trained. For example, if the model 108*b* was trained on speed, and the prediction vector indicates a value for speed that is close to zero (meaning slower speech would produce higher user engagement), the user interaction analysis module 112 identifies that communication feature and transmit the feature, and one or more attributes of the prediction vector (i.e., slower speech) to the user interaction modification module 114.

The user interaction modification module 114 generates (216) a user interaction modification based upon the identified communication feature. For example, if the communication feature is speed and the prediction vector indicates that slower speech would produce higher user engagement, the user interaction modification module 114 can generate a modification to the user interaction in the communication session currently being conducted between the client computing device 102 and client computing device 103. In the case where the interaction is a voice call between a user at client device 102 and a live customer service agent at client device 103, the user interaction modification module 114 can generate instructions for the client device 103 to display a pop-up window on the screen of the client device 103 that instructs the agent to slow down his or her talking speed. In the case where the interaction is a chat session between a user at client device 102 and an automated chat bot at client device 103, the user interaction modification module 114 can programmatically alter the rate at which subsequent messages (and/or individual words in messages) are generated by the chat bot for display on client device 102, or a rate at which each word in subsequent messages appears on the screen of the client device 102.

The user interaction modification module 114 transmits (218) the modification to at least one of the client computing device 102 or client computing device 103 for implementation. Continuing with the above examples, in the case of a voice call the user interaction modification module 114 transmits programmatic instructions to the client device 103 that executes a local application installed on client device to launch and display an alert message to the agent instructing him or her to slow speech. Similarly, in the case of a chat bot session, the user interaction module 114 transmits programmatic instructions to the client device 103 that changes the speed at which the device 103 generates and/or transmits messages to client device 102—it should be appreciated that the programmatic instructions can alternatively or additionally be transmitted to software on client device 102 to achieve the same modification.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated, predictive analysis of user interactions to determine a modification to one or more features of the user interactions based upon a plurality of competing artificial intelligence classification models, the system comprising:

a first client computing device of a first communication participant;

a second client computing device of a second communication participant; and a server computing device coupled to the first client computing device and the second client computing device via one or more network connections, the server computing device comprising a memory for storing programmatic instructions and a processor that executes the programmatic instructions to:

receive first encoded text corresponding to prior user interactions, each segment of the first encoded text comprising one or more multidimensional vectors representing a prior user interaction, wherein each multidimensional vector comprises one or more communication features of the prior user interaction and a user engagement level associated with the prior user interaction;

train, using the first encoded text, a plurality of artificial intelligence classification models executing on the server computing device, wherein each artificial intelligence classification model is trained according to a different one of the one or more communication features;

determine a prediction cost for each of the plurality of artificial intelligence classification models based upon the training;

receive second encoded text corresponding to a current user interaction between the first client computing device and the second client computing device, each segment of the second encoded text comprising one or more multidimensional vectors representing the current user interaction, wherein each multidimensional vector comprises one or more communication features of the current user interaction;

execute, using the second encoded text, the plurality of trained artificial intelligence classification models to generate a prediction vector for each trained artificial intelligence classification model, wherein each prediction vector comprises a predicted value for the one or more communication features of the current user interaction that maximizes user engagement;

select one of the plurality of trained artificial intelligence classification models based upon the prediction vectors generated from the plurality of trained artificial intelligence classification models and the prediction costs associated with the plurality of trained artificial intelligence classification models, wherein the selecting comprises:

comparing communication features of each of the prediction vectors with a ground truth value to generate one or more votes for each prediction vector;

calculating a cost value for each prediction cost; and selecting one of the artificial intelligence classification models based on the maximum number of votes and the maximum cost value;

identify the communication feature upon which the selected artificial intelligence classification model was trained;

generate a user interaction modification based upon the identified communication feature; and transmit the generated user interaction modification to at least one of the first client computing device or the second client computing device;

wherein at least one of the first client computing device and the second client computing device adapts a communication stream based upon the generated user interaction modification.

2. The system of claim 1, wherein one or more of the plurality of artificial intelligence classification models comprises a neural network.

3. The system of claim 1, wherein the prior user interactions comprise online chat messages or digital speech segments.

4. The system of claim 1, wherein the one or more communication features comprise tone, speed, volume, or word choice.

5. The system of claim 1, wherein generating a user interaction modification based upon the identified communication feature comprises creating a recommendation message instructing a communication participant to change the identified communication feature in subsequent user interactions.

6. The system of claim 1, wherein the server computing device comprises a plurality of processors and each artificial intelligence classification model executes on a different processor of the server computing device.

7. The system of claim 6, wherein each of the plurality of processors comprises a GPU.

8. The system of claim 1, wherein the server computing device uses the prediction vectors generated by executing the plurality of trained artificial intelligence classification models to train the artificial intelligence classification models prior to subsequent user interactions.

9. The system of claim 1, wherein at least one of the first client computing device and the second client computing device displays the generated user interaction modification to the corresponding communication participant.

10. A computerized method of automated, predictive analysis of user interactions to determine a modification to one or more features of the user interactions based upon a plurality of competing artificial intelligence classification models, the method comprising:

receiving, by a server computing device coupled to a first client computing device of a first communication participant and a second client computing device of a second communication participant, first encoded text corresponding to prior user interactions, each segment of the first encoded text comprising one or more multidimensional vectors representing a prior user interaction, wherein each multidimensional vector comprises one or more communication features of the prior user interaction and a user engagement level associated with the prior user interaction;

training, by the server computing device using the first encoded text, a plurality of artificial intelligence classification models executing on the server computing device, wherein each artificial intelligence classification model is trained according to a different one of the one or more communication features;

determining, by the server computing device, a prediction cost for each of the plurality of artificial intelligence classification models based upon the training;

receiving, by the server computing device, second encoded text corresponding to a current user interaction between the first client computing device and the second client computing device, each segment of the second encoded text comprising one or more multidimensional vectors representing the current user interaction, wherein each multidimensional vector comprises one or more communication features of the current user interaction;

executing, by the server computing device using the second encoded text, the plurality of trained artificial intelligence classification models to generate a prediction vector for each trained artificial intelligence classification model, wherein each prediction vector comprises a predicted value for the one or more communication features of the current user interaction that maximizes user engagement;

selecting, by the server computing device, one of the plurality of trained artificial intelligence classification models based upon the prediction vectors generated from the plurality of trained artificial intelligence classification models and the prediction cost associated with the plurality of trained artificial intelligence classification models, wherein the selecting comprises:

comparing communication features of each of the prediction vectors with a ground truth value to generate one or more votes for each prediction vector;

calculating a cost value for each prediction cost; and selecting one of the artificial intelligence classification models based on the maximum number of votes and the maximum cost value;

identifying, by the server computing device, the communication feature upon which the selected artificial intelligence classification model was trained;

generating, by the server computing device, a user interaction modification based upon the identified communication feature; and transmitting, by the server computing device, the generated user interaction modification to at least one of the first client computing device or the second client computing device;

wherein at least one of the first client computing device and the second client computing device adapts a communication stream based upon the generated user interaction modification.

11. The method of claim 10, wherein one or more of the plurality of artificial intelligence classification models comprises a neural network.

12. The method of claim 10, wherein the prior user interactions comprise online chat messages or digital speech segments.

13. The method of claim 10, wherein the one or more communication features comprise tone, speed, volume, or word choice.

14. The method of claim 10, wherein generating a user interaction modification based upon the identified communication feature comprises creating, by the server computing device, a recommendation message instructing a communication participant to change the identified communication feature in subsequent user interactions.

15. The method of claim 10, wherein the server computing device comprises a plurality of processors and each artificial intelligence classification model executes on a different processor of the server computing device.

16. The method of claim 15, wherein each of the plurality of processors comprises a GPU.

17. The method of claim 10, wherein the server computing device uses the prediction vectors generated by executing the plurality of trained artificial intelligence classification models to train the artificial intelligence classification models prior to subsequent user interactions.

18. The method of claim 10, wherein at least one of the first client computing device and the second client computing device displays the generated user interaction modification to the corresponding communication participant.

* * * * *